United States Patent
Wu

(10) Patent No.: US 8,630,642 B2
(45) Date of Patent: Jan. 14, 2014

(54) METHOD OF HANDLING PROXIMITY INFORMATION TRANSMISSION AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 12/910,879

(22) Filed: Oct. 25, 2010

(65) Prior Publication Data

US 2011/0105083 A1    May 5, 2011

Related U.S. Application Data

(60) Provisional application No. 61/256,317, filed on Oct. 30, 2009, provisional application No. 61/290,890, filed on Dec. 30, 2009.

(51) Int. Cl.
*H04W 4/00* (2009.01)
*H04W 36/00* (2009.01)

(52) U.S. Cl.
USPC ........................................ 455/435.2; 455/436

(58) Field of Classification Search
USPC .................. 370/331, 332; 709/225; 455/11.1
See application file for complete search history.

(56) References Cited

U.S. PATENT DOCUMENTS

| | | | |
|---|---|---|---|
| 7,697,940 B2 | 4/2010 | Jung | |
| 7,751,778 B1 * | 7/2010 | Ngan | 455/11.1 |
| 8,086,236 B2 | 12/2011 | Wu | |
| 8,116,776 B1 | 2/2012 | Jagadeesan | |
| 8,165,590 B2 | 4/2012 | Gunnarsson | |
| 8,185,116 B2 | 5/2012 | Wu | |
| 8,204,481 B2 | 6/2012 | Kone | |
| 8,265,033 B2 | 9/2012 | Gunnarsson | |
| 2002/0142774 A1* | 10/2002 | Saint-Hilaire et al. | 455/445 |
| 2008/0069053 A1* | 3/2008 | Kim et al. | 370/332 |
| 2008/0089291 A1 | 4/2008 | Song | |
| 2008/0139207 A1* | 6/2008 | Son et al. | 455/437 |
| 2009/0011790 A1* | 1/2009 | Lee et al. | 455/525 |
| 2010/0323633 A1* | 12/2010 | Pani et al. | 455/67.14 |
| 2011/0098048 A1* | 4/2011 | Zhang et al. | 455/438 |

(Continued)

FOREIGN PATENT DOCUMENTS

| CN | 1610324 A | 4/2005 |
|---|---|---|
| CN | 101287294 A | 10/2008 |

(Continued)

OTHER PUBLICATIONS

European patent application No. 10014143.1, European Search Report mailing date: Feb. 24, 2011.

(Continued)

*Primary Examiner* — Ariel Balaoing
*Assistant Examiner* — Christopher Kohlman
(74) *Attorney, Agent, or Firm* — Winston Hsu; Scott Margo

(57) ABSTRACT

A method of handling proximity information transmission for a mobile device having a closed subscriber group (CSG) whitelist capable of providing a list of accessible CSG cells in a wireless communication system is disclosed. The method comprises sending the proximity information to a network of the wireless communication system when a CSG cell in the CSG whitelist is detected, and resending the proximity information to the network when the proximity information is not received by the network.

5 Claims, 6 Drawing Sheets

(56) References Cited

U.S. PATENT DOCUMENTS

| | | | |
|---|---|---|---|
| 2011/0105127 A1 | 5/2011 | Wu | |
| 2011/0179168 A1* | 7/2011 | Nylander et al. | 709/225 |
| 2011/0206011 A1* | 8/2011 | Ishida et al. | 370/331 |
| 2012/0270552 A1 | 10/2012 | Shi | |

FOREIGN PATENT DOCUMENTS

| | | | |
|---|---|---|---|
| CN | 101400160 A | 4/2009 | |
| EP | 2317795 A1 | 5/2011 | |
| JP | 2009111624 A | 5/2009 | |
| JP | 201197589 A | 5/2011 | |
| JP | 201197591 A | 5/2011 | |
| KR | 100677460 B1 | 2/2007 | |
| KR | 1020070060225 A | 6/2007 | |
| KR | 1020080032960 A | 4/2008 | |
| KR | 1020090022567 A | 3/2009 | |
| TW | 201014378 | 4/2010 | |
| WO | 2008154310 A2 | 12/2008 | |
| WO | 2009009498 A1 | 1/2009 | |
| WO | 2009044317 A2 | 4/2009 | |
| WO | 2009095970 A1 | 8/2009 | |
| WO | 2009117658 A1 | 9/2009 | |
| WO | 2009128642 A2 | 10/2009 | |

OTHER PUBLICATIONS

3GPP TS 25.367 V9.1.0 (Sep. 2009), "3rd Generation Partnership Project; Technical Specification Group Radio Access Network; Mobility Procedures for Home NodeB; Overall Description; Stage 2 (Release 9)", XP050368064, pp. 1-13.

3GPP TS 36.331 V9.0.0 3rd Generation Partnership Project; Technical Specification Group Radio Access Network; Evolved Universal Terrestrial Radio Access (E-UTRA) Radio Resource Control (RRC); Protocol specification (Release 9), Sep. 2009.

3GPP R2-097445 "Slight revision of baseline CR capturing agreements on inbound mobility", Nov. 2009.

3GPP R2-097466 "Introduction of network ordered SI reporting", Nov. 2009.

Office action mail on Oct. 24, 2011 for the Korean application No. 10-2010-0105879, filed Oct. 28, 2010, p. 1-5.

3GPP TS 25.331 V9.0.0 3rd Generation Partnership Project; Technical Specification Group Radio Access Network; Radio Resource Control (RRC); Protocol Specification (Release 9); p. 1-506; Sep. 2009.

3GPP R2-096293 Capturing agreements on inbound mobility, Oct. 2009.

Office action mailed on Jun. 12, 2012 for the Japanese application No. 2010-245371, filing date Nov. 1, 2010, pp. 1-3.

Office action mailed on May 29, 2012 for the Korean application No. 10-2010-0105879, filing date Oct. 28, 2010, p. 1-3.

Panasonic, Configuration for proximity indication in measurement report, 3GPP TSG RAN WG2#67bis, R2-095606, Oct. 12-16, 2009, Miyazaki, Japan.

Motorola et al., Draft CR capturing HeNB inbound mobility agreements, 3GPP TSG-RAN WG2 Meeting #67, R2-095342, Aug. 24-28, 2009, Shenzhen, China.

NTT Docomo, Inc., CSG inbound handover-proximity indication, 3GPP TSG-RAN WG2 #67bis, Tdoc-R2-096019, Miyazaki, Japan, Oct. 12-16, 2009.

Office action mailed on Feb. 14, 2012 for the Japanese application No. 2010-243897, filing date Oct. 29, 2009, p. 1-3.

Alcatel-Lucent, Inbound Mobility Proximity report options, 3GPP TSG-RAN WG2 Meeting #67, R2-094256, Shenzhen, China, Aug. 24-28, 2009.

Office action mailed on Oct. 16, 2012 for the Japanese application No. 2010-245371, filing date Nov. 1, 2010, pp. 1-3.

Notice of Allowance mailed on Nov. 7, 2012 for the U.S. Appl. No. 12/911,747, filed Oct. 26, 2010, p. 1-22.

Office action mailed on Dec. 5, 2012 for the China application No. 201010536145.5, filing date Oct. 29, 2010.

Office Action mailed on Dec. 18, 2012 for the Korean application No. 10-2010-0107111, filing date Oct. 29, 2010.

Office action mailed on Sep. 22, 2013 for the China application No. 201010536145.5, filed Oct. 29, 2010, p. 1-5.

"3rd Generation Partnership Project; Technical Specification Group Services and System Aspects; Service accessibility (Release 8)" 3GPP TS 22.011 V.8.4.1, p. 1-25, Jun. 30, 2008

Office action mailed on Nov. 22, 2013 for the Taiwan application No. 099137302, filed Oct. 29, 2010, p. 1-6.

* cited by examiner

METHOD OF HANDLING PROXIMITY INFORMATION TRANSMISSION AND RELATED COMMUNICATION DEVICE

CROSS REFERENCE TO RELATED APPLICATIONS

This application claims the benefit of U.S. Provisional Application No. 61/256,317, filed on Oct. 30, 2009 and entitled "Methods to transmit proximity indication information in wireless communications system", and U.S. Provisional Application No. 61/290,890, filed on Dec. 30, 2009 and entitled "Methods to report proximity indication information after handover in wireless communications system", the contents of which are incorporated herein in their entirety.

BACKGROUND OF THE INVENTION

1. Field of the Invention

The application relates to a method utilized in a wireless communication system and a communication device thereof, and more particularly, to a method of handling proximity information transmission in a wireless communication system and a related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the LTE system, a UE supporting a closed subscriber group (CSG) feature can transmit proximity information to the network for triggering inbound mobility (namely handover) to a CSG/hybrid cell when the UE is configured proximity indication reporting by the network. The UE supporting the CSG feature has a CSG whitelist which contains one or more CSG identities associated with CSG cells on which the UE is allowed access. The CSG cell is associated with a small coverage base station which may be deployed for magnificent advantages, such as the high bandwidth wireless internet access in the home and office, and efficient and cost-effective capacity solution for indoor coverage, whereas the hybrid cell is accessed as a CSG cell by a UE whose CSG whitelist contains a CSG identity of the cell and as a normal cell by all other UEs.

As to an operation of the inbound mobility, the proximity information is sent to the network (i.e. the E-UTRAN, an eNB, or a base station) when the UE enters proximity of a cell whose CSG identity is in the CSG whitelist of the UE. The network configures the UE with a measurement configuration including a measurement gap if needed after the proximity information is received. The UE performs the measurement to the CSG cell, so as to generate a measurement report to the network for a handover preparation. Moreover, the network configures the UE with system information (SI) reporting. The UE reads system information of the CSG cell, and then sends an SI report including the CSG identity of the CSG cell to the network, so that the network can check whether the CSG cell is allowed for access based on the CSG identity and the CSG whitelist for the UE. In other words, the network determines whether to handover the UE to the CSG cell according to the measurement report and the SI report, and sends a handover command to the UE when the network decides to handover the UE to the CSG cell.

In addition, after sending the "entering" proximity information to the network, if the UE determines that it is no longer near the entered CSG cell, the UE shall send the "leaving" proximity information to the network. Otherwise, the network does not know that the UE is left, and may ask the UE to perform the measurement to the left CSG cell, thereby causing radio resource waste.

However, due to unclear specification for proximity information transmission in the LTE system, the UE may not perform the inbound mobility to the CSG/hybrid cell. In addition, several scenarios are described as follows.

In the first scenario, proximity information sent by the UE may not be received by the network due to a handover or an RRC connection re-establishment procedure (e.g. caused by radio link failure, RLC unrecoverable error, MAC random access error, etc). If the proximity information is not received by the network, the inbound mobility to CSG/hybrid cells cannot be started since the network does not know that the UE enters proximity of CSG cells in the CSG whitelist of the UE. Thus, a user of the UE may complain why the UE cannot use the CSG cell for communication. The detailed description associated with the operation of the inbound mobility can be referred from above, so it is omitted herein.

In the second scenario, the UE connects to a first eNB and enters the proximity of cells whose CSG identities are in the CSG whitelist of the UE. Therefore, the UE sends proximity indication to the first eNB for the inbound mobility. Meanwhile, the first eNB sends a handover command to command the UE to handover to a second eNB. In addition, the handover command enables the proximity indication reporting, so that the UE is allowed to transmit the proximity information to the second eNB. However, the UE is still in the proximity of the cells after the UE is handover to the second eNB. In other words, the UE does not leave the proximity of the cells after handover to the second eNB. In this situation, the UE does not send the proximity information since the UE never leaves the proximity of the cells. Therefore, the second eNB does not know the UE is in the proximity of the cells, and thereby cannot handover the UE to a CSG cell or cannot configure the UE system information (SI) reporting.

In addition, the UE connecting to the first eNB is configured SI reporting. The UE sends the SI report including CSG identity to the network, so that the network can determine whether the CSG cell is allowed for access according to the CSG identity. However, after the UE is handover to the second eNB, the UE does not send the SI report since the SI reporting configuration from the first eNB is removed. Therefore, the second eNB does not receive the SI report from the UE, and thereby cannot handover the UE to a CSG cell.

Furthermore, the abovementioned situation may occur in a universal mobile telecommunications system (UMTS). For example, the UE provides a serving radio network controller (SRNC) with the proximity information when it is near or left a CSG/hybrid cell whose CSG identity is in the UE's CSG whitelist. Due to similar behavior in the UMTS system, the foregoing problems arise as well.

SUMMARY OF THE INVENTION

The application discloses a method of handling proximity information transmission in a wireless communication system and a related communication device in order to solve the abovementioned problems.

A method of handling proximity information transmission for a mobile device having a closed subscriber group (CSG)

whitelist capable of providing a list of accessible CSG cells in a wireless communication system is disclosed. The method comprises sending the proximity information to a network of the wireless communication system when a CSG cell in the CSG whitelist is detected, and resending the proximity information to the network when the proximity information is not received by the network.

A method of handling proximity information transmission for a mobile device having a closed subscriber group (CSG) whitelist capable of providing a list of accessible CSG cells in a wireless communication system is disclosed. The method comprises sending the proximity information to a first base station of the wireless communication system when entering proximity of CSG cells in the CSG whitelist, performing a connection transfer from the first base station to a second base station of the wireless communication system, and resending the proximity information to the second base station after the connection transfer is complete if staying the proximity of the CSG cells in the CSG whitelist.

A method of handling proximity information for a first base station in a wireless communication system is disclosed. The method comprises receiving proximity information from a mobile device of the wireless communication system, and signaling that the mobile device enters proximity of CSG cells in a CSG whitelist included in the mobile device, to a second base station of the wireless communication system when the mobile device is going to transfer a connection from the first base station to the second base station.

A communication device of a wireless communication system for handling proximity information transmission is disclosed. The communication device has a closed subscriber group (CSG) whitelist capable of providing a list of accessible CSG cells, and comprises means for sending the proximity information to a network of the wireless communication system when a CSG cell in the CSG whitelist is detected, and means for resending the proximity information to the network when the proximity information is not received by the network.

A communication device of a wireless communication system for handling proximity information transmission is disclosed. The communication device has a closed subscriber group (CSG) whitelist capable of providing a list of accessible CSG cells, and comprises means for sending the proximity information to a first base station of the wireless communication system when entering proximity of CSG cells in the CSG whitelist, means for performing a connection transfer from the first base station to a second base station of the wireless communication system, and means for resending the proximity information to the second base station after the connection transfer is complete if staying the proximity of the CSG cells in the CSG whitelist.

A first base station of a wireless communication system for handling proximity information is disclosed. The first base station comprises means for receiving proximity information from a mobile device of the wireless communication system, and means for signaling that the mobile device enters proximity of CSG cells in a CSG whitelist included in the mobile device, to a second base station of the wireless communication system when the mobile device is going to transfer a connection from the first base station to the second base station.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
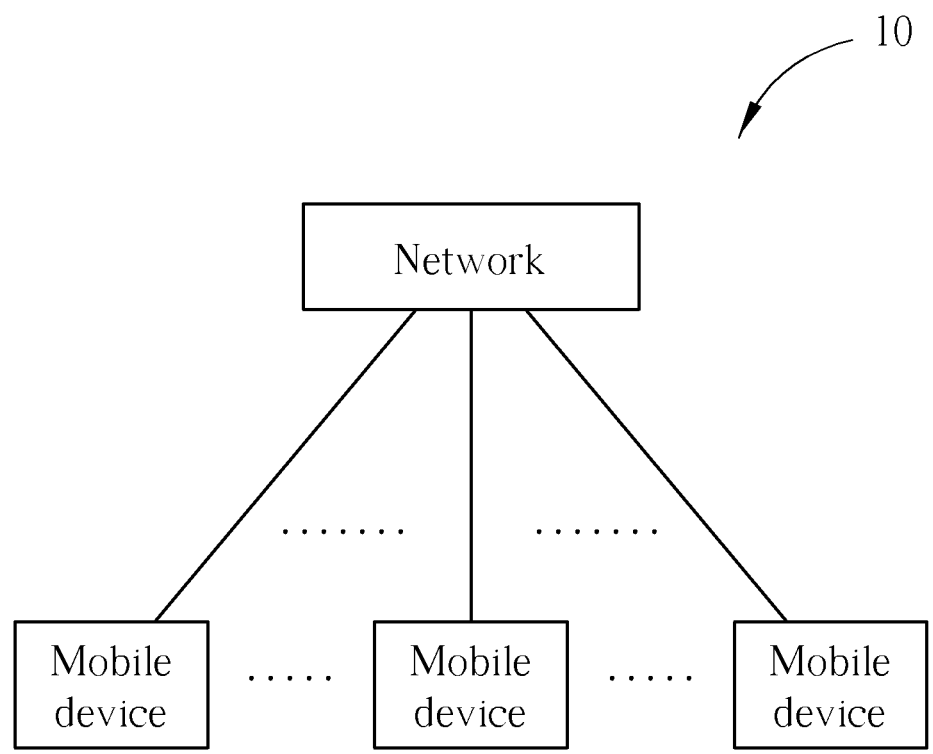
FIG. 1 illustrates a schematic diagram of an exemplary wireless communication system.

Please refer to FIG. 1, which illustrates a schematic diagram of a wireless communication system 10 according to an example. Briefly, the wireless communication system 10 is composed of a network and a plurality of mobile devices. The wireless communication system 10 can be a UMTS (Universal Mobile Telecommunications System), an LTE (long-term evolution) system or any other similar network system. In the LTE system, the network can be referred as a EUTRAN (evolved-UTRAN) comprising a plurality of eNBs or a core network entity (e.g. Mobility Management Entity called MME), whereas the mobile devices are referred as to user equipments (UEs). The UEs can be devices such as mobile phones, computer systems, etc. This terminology will be used throughout the application for ease of reference. However, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
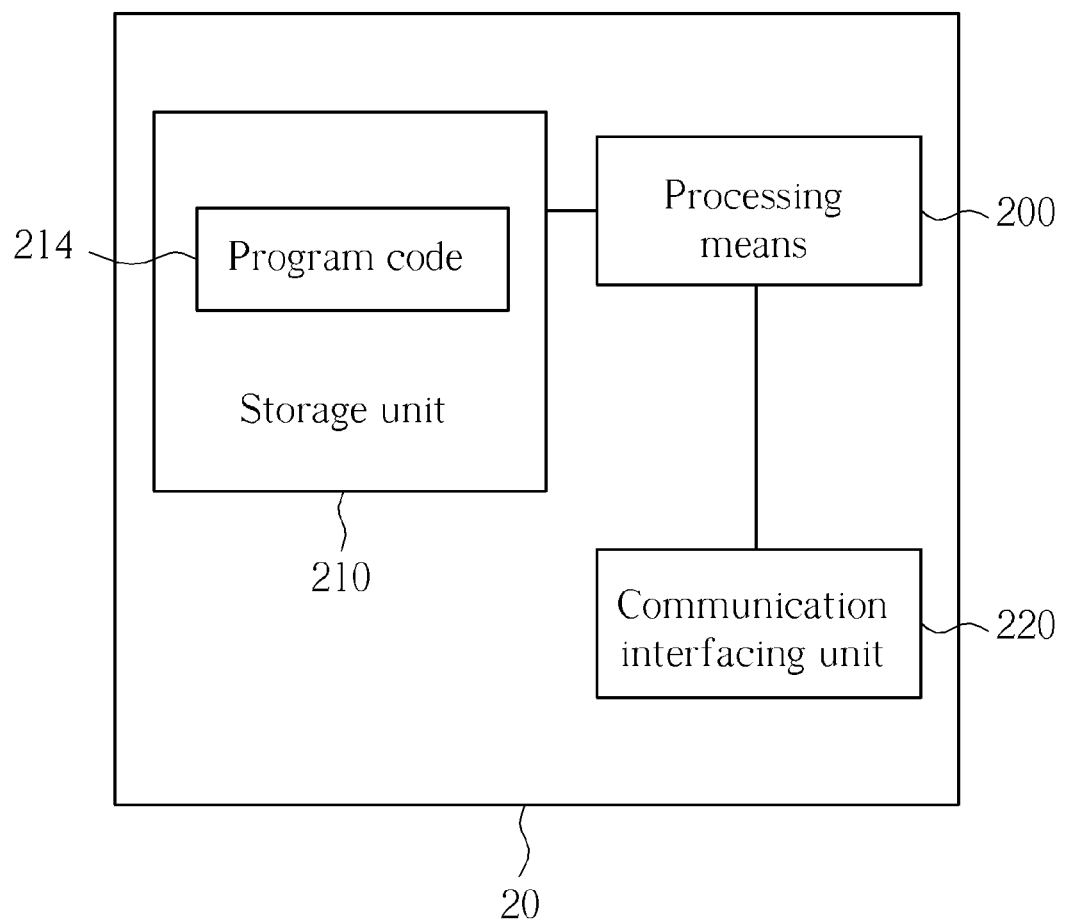
FIG. 2 illustrates a schematic diagram of an exemplary communication device.

FIG. 2 illustrates a schematic diagram of an exemplary communication device 20. The communication device 20 can be the mobile device 10 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
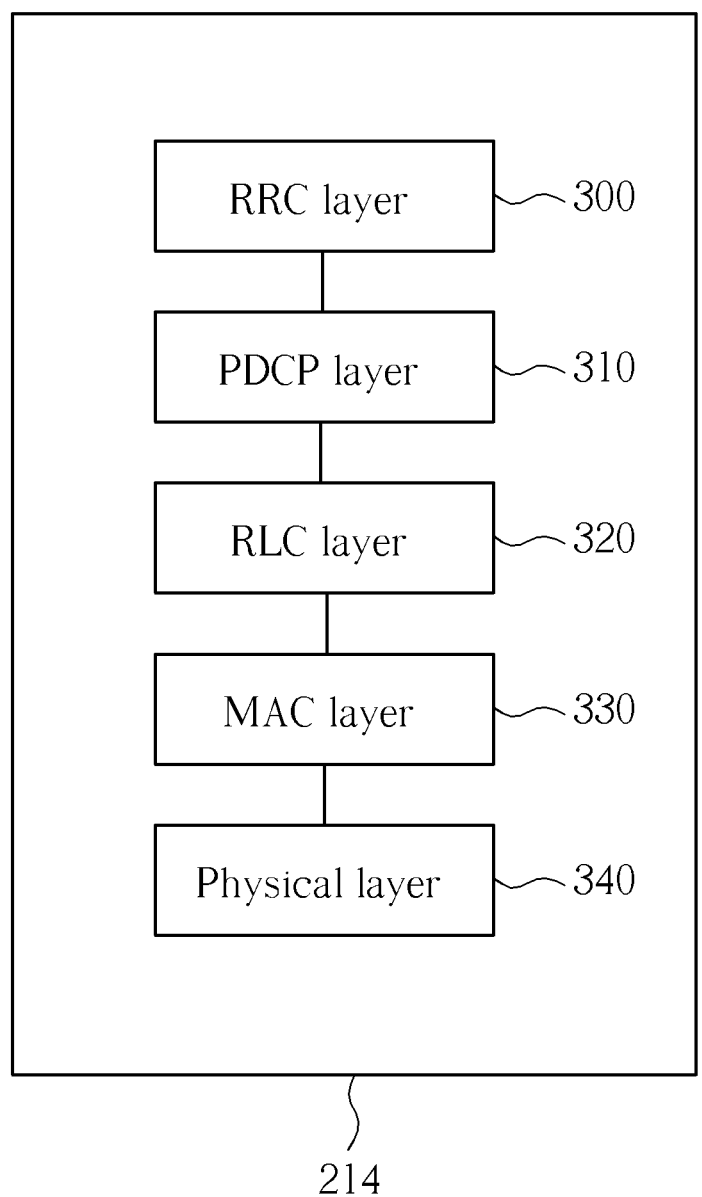
FIG. 3 illustrates a schematic diagram of communication protocol layers for an exemplary communication system.

Please refer to FIG. 3, which illustrates a schematic diagram of communication protocol layers for the LTE system. The behaviors of some of the protocol layers may be defined in the program code 214 and executed by the processing means 200. The protocol layers from top to bottom are a radio resource control (RRC) layer 300, a packet data convergence protocol (PDCP) layer 310, a radio link control (RLC) layer 320, a medium access control (MAC) layer 330 and a physical (PHY) layer 340. The RRC layer 300 is used for performing RRC connection management, measurement control, handover, and radio bearer (RB) control responsible for generating or releasing radio bearers (RBs). Please note that, before a source eNB of the network of FIG. 1 handovers the mobile device to a target eNB, the source eNB issues a HANDOVER REQUEST message for passing necessary information to prepare the handover for the UE, to the target eNB/MME. After the target eNB/MME prepares the handover and sends the HANDOVER REQUEST ACKNOWLEDGE/HANDOVER COMMAND to the source eNB, the source eNB can handover the UE to the target eNB. This process hereafter is called handover preparation procedure.

Figure 4:
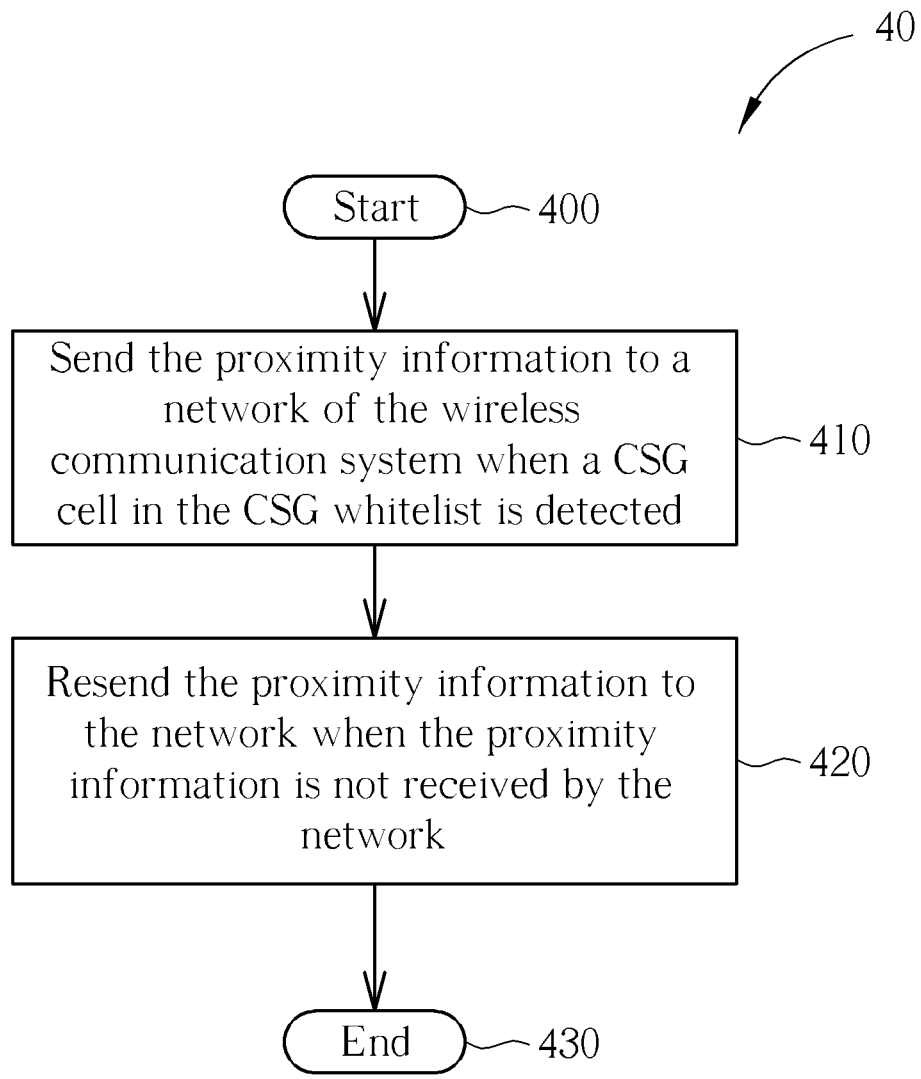
FIG. 4-6 are flowcharts of exemplary processes.

Please refer to FIG. 4, which illustrates a flowchart of an exemplary process 40. The process 40 is utilized in a UE, as the mobile device of FIG. 1, for handling proximity information transmission. The UE has a closed subscriber group (CSG) whitelist capable of providing a list of accessible CSG cells. The process 40 can be compiled into the program code 214 and includes the following steps:

Step 400: Start.

Step 410: Send the proximity information to a network of the wireless communication system when a CSG cell in the CSG whitelist is detected.

Step 420: Resend the proximity information to the network when the proximity information is not received by the network.

Step 430: End.

According to the process 40, the UE resends the proximity information to the network when the previous proximity information is not successfully transmitted to the network. For example, the UE sends the proximity information to the network, but does not receive an acknowledgement (e.g. RLC acknowledgement) for confirmation of the proximity information transmission. Therefore, the UE sends the proximity information to the network again. In addition, the UE may send the proximity information unsuccessfully due to a handover procedure or an RRC connection re-establishment procedure. In this situation, the UE resends the proximity information after the handover or the RRC connection re-establishment is completely performed.

The process 40 clearly specifies how the UE shall deal with the proximity information transmission failure. The UE resends the proximity information to the network when the network does not receive the proximity information, so that the network knows that the UE enters proximity of cells whose CSG identities are in the CSG whitelist from the proximity information, and thereby can handover the UE to a CSG cell. A proximity information retransmission mechanism is clearly defined herein, thereby increasing the reliability of proximity information transmission.

Figure 5:
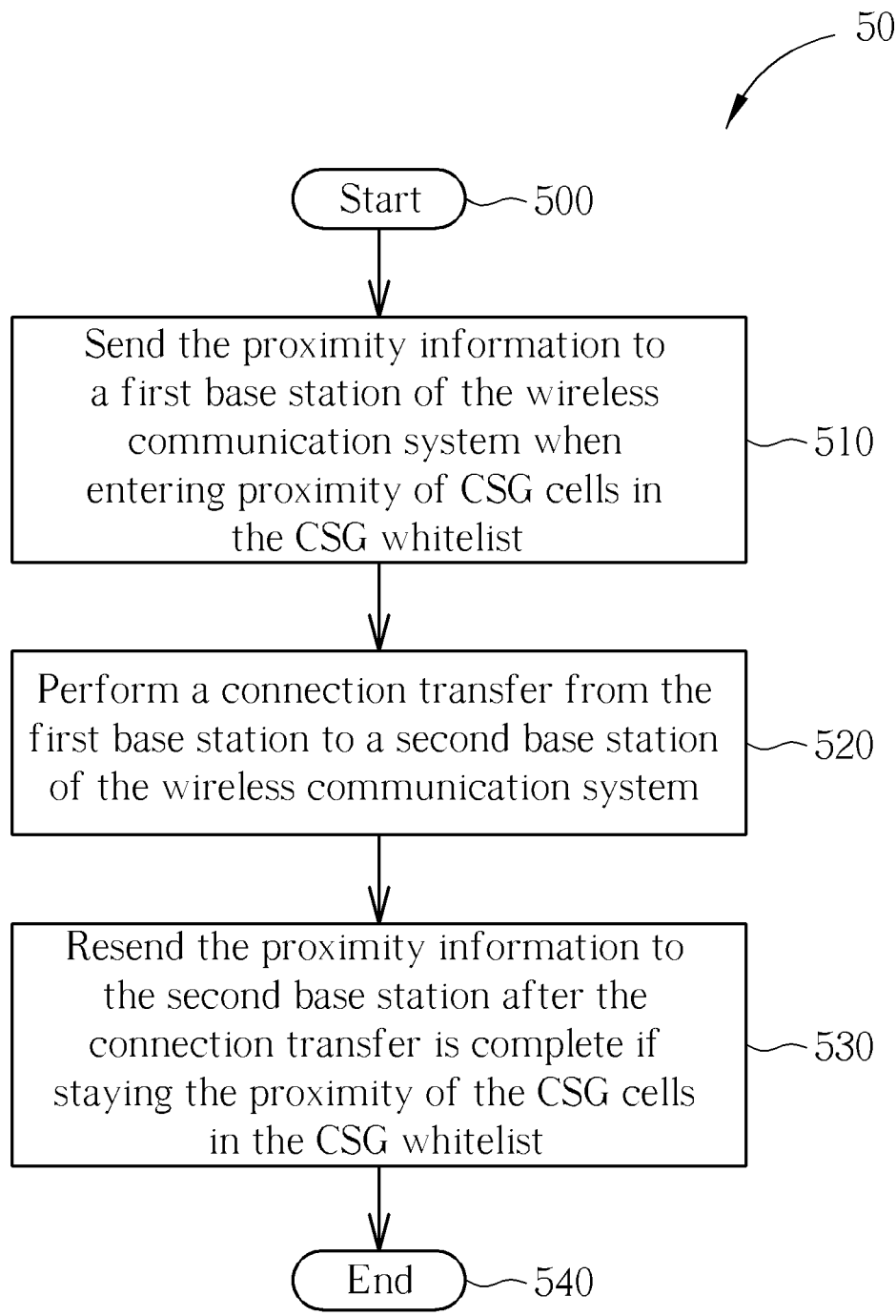

Please refer to FIG. 5, which illustrates a flowchart of an exemplary process 50. The process 50 is utilized in a UE, as the mobile device of FIG. 1, for handling proximity information transmission. The UE has a CSG whitelist capable of providing a list of accessible CSG cells. The process 50 can be compiled into the program code 214 and includes the following steps:

Step 500: Start.

Step 510: Send the proximity information to a first base station of the wireless communication system when entering proximity of CSG cells in the CSG whitelist.

Step 520: Perform a connection transfer from the first base station to a second base station of the wireless communication system.

Step 530: Resend the proximity information to the second base station after the connection transfer is complete if staying the proximity of the CSG cells in the CSG whitelist.

Step 540: End.

According to the process 50, after the UE is transferred to the second station, the UE resends the proximity information to the second base station if the UE has not left the proximity of the CSG cells detected before the connection transfer. The connection transfer may be a handover procedure or an RRC connection re-establishment procedure. In other words, after the UE completely performs the handover procedure or the RRC connection re-establishment procedure to transfer the connection from the first base station to the second base station, the UE resends the proximity information to the second base station if staying the proximity of the CSG cells. Therefore, the second base station knows that the UE enters the proximity of the CSG cells from the proximity information, and thereby can handover the UE to a CSG cell or configure the UE with system information (SI) reporting.

Take an example based on the process 50. The UE connects to a source eNB and is configured with proximity indication reporting by the source eNB. When entering proximity of cells whose CSG identities are in the UE's CSG whitelist, the UE sends a first proximity information (e.g. "entering" proximity information) to the source eNB. Meanwhile, the source eNB handovers the UE to a target eNB by a handover command. The handover command enables proximity indication reporting to the target eNB, so that the UE is allowed to transmit proximity information to the target eNB after the handover procedure. After the UE is handover to the target eNB, the UE sends the first proximity information to the target eNB when the UE still enters the proximity of the CSG cells (namely the UE never leaves the proximity of all of the CSG cells). Therefore, the target eNB can handover the UE to a CSG cell or configure the UE with SI reporting since the target eNB knows that the UE enters the proximity of the CSG cells from the first proximity information.

In addition, after the UE is handover to the target eNB, the UE sends a second proximity information (e.g. "leaving" proximity information) to the target eNB when the UE leaves the proximity of the CSG cells (namely the UE leaves the proximity of all of the CSG cells). Therefore, the target eNB knows that the UE leaves the proximity of the CSG cells, and thereby does not perform unnecessary actions (e.g. handover the UE to a CSG cell in the CSG whitelist) for the UE. Please note that, the UE sends the second proximity information to the target eNB only if the source eNB signals that the UE enters the proximity of the CSG cells to the target eNB. Otherwise, the UE does not need to send the second proximity information to the target eNB since the target eNB does not know that the UE has entered the proximity of the CSG cells, so as to save transmission power for the second proximity information. In other words, the UE clears configurations related to the proximity indication reporting configured by the source eNB. Therefore, the UE does not send the proximity information to the target eNB after the handover until the UE enters proximity of cells whose CSG identities are in the CSG whitelist.

Figure 6:
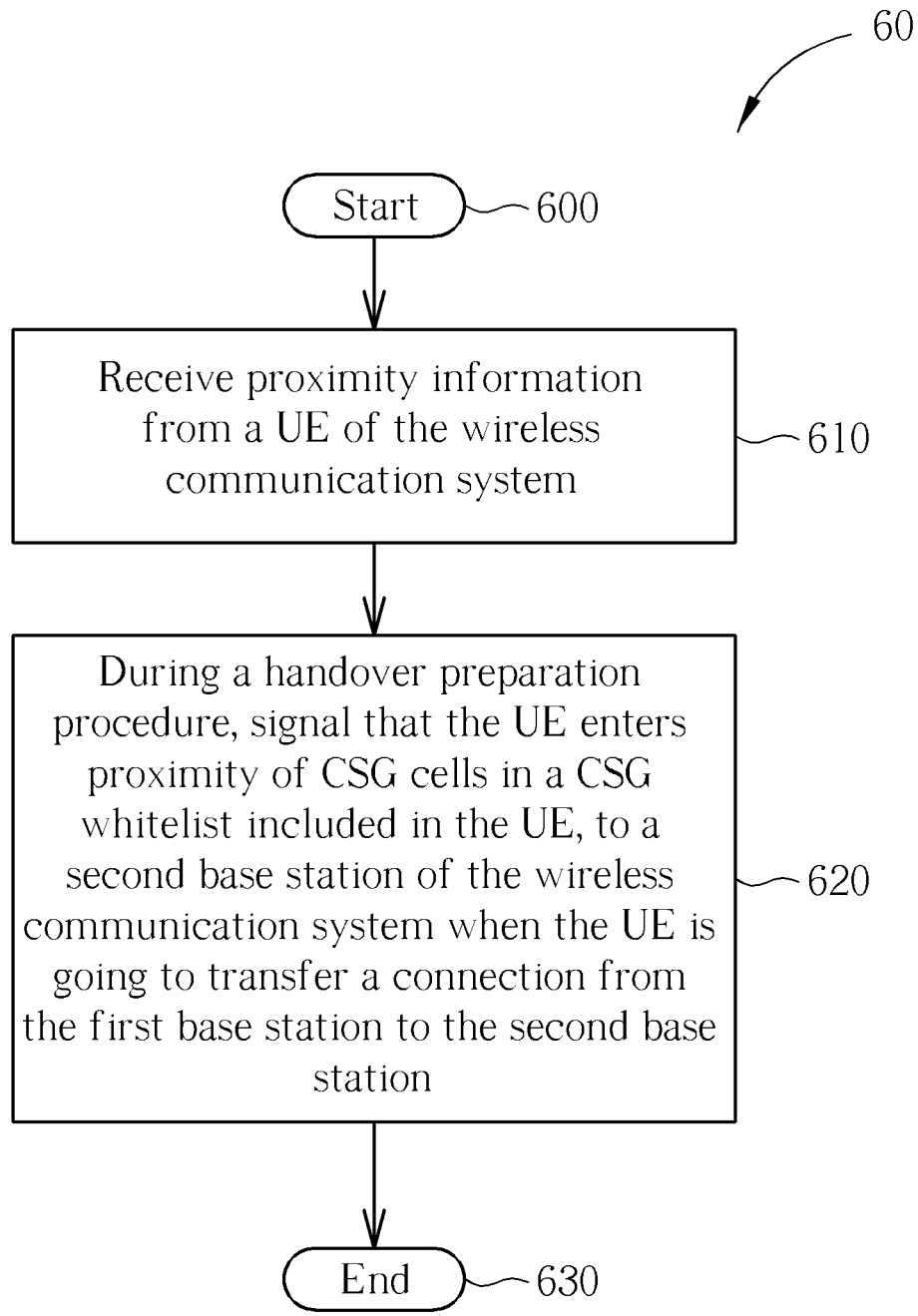

Please refer to FIG. 6, which illustrates a flowchart of an exemplary process 60. The process 60 is utilized in the network (e.g. an eNB or a base station) of FIG. 1, for handling proximity information. The process 60 can be compiled into the program code 214 and includes the following steps:

Step 600: Start.

Step 610: Receive proximity information from a UE of the wireless communication system.

Step 620: During a handover preparation procedure, signal that the UE enters proximity of CSG cells in a CSG whitelist included in the UE, to a second base station of the wireless communication system when the UE is going to transfer a connection from the first base station to the second base station.

Step 630: End.

According to the process 60, the second base station is notified that the UE enters the proximity of the CSGs by the first base station when the UE performs a connection transfer from the first base station to the second base station. Therefore, the second base station knows that the UE is in the proximity of the CSG cells, so that the second base station can configure the UE with SI reporting or handover the UE to a CSG cell.

Take an example based on the process 60. The UE connects to a source eNB and is configured with proximity indication reporting by the source eNB. When entering the proximity of cells whose CSG identities are in the UE's CSG whitelist, the UE sends a first proximity information to the source eNB. Before the source eNB handovers the UE to a target eNB (namely during the handover preparation procedure), the source eNB signals that the UE enters the proximity of the CSG cells, to the target eNB. Therefore, after the UE is handover to the target eNB, the target eNB can configure proximity indication reporting, SI reporting, or handover the UE to a CSG cell since the target eNB has known that the UE is in the proximity of the CSG cells from the source eNB. In addition, the source eNB may signal SI reporting configuration to the target eNB during the handover preparation procedure. For example, the UE connects to the source eNB and sends a SI report to the source eNB. Before the source eNB handovers the UE to the target eNB, the source eNB signals information of the SI report to the target eNB. Therefore, the target eNB knows that the UE enters the proximity of the CSG cells from the source eNB, and thereby can configure proximity indication reporting, SI reporting, or handover the UE to a CSG cell.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary examples and means are provided for handling the proximity information transmission for the UE as the connection transfer (e.g. the handover or the RRC connection re-establishment procedure) occurs, so as to perform the inbound mobility to a CSG cell successfully.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling proximity information transmission for a mobile device having a closed subscriber group (CSG) whitelist capable of providing a list of accessible CSG cells in a wireless communication system, the method comprising:
   sending the proximity information to a first base station of the wireless communication system when entering proximity of CSG cells in the CSG whitelist;
   performing a connection transfer from the first base station to a second base station of the wireless communication system;
   resending the proximity information to the second base station after the connection transfer is complete when staying in the proximity of the CSG cells in the CSG whitelist; and
   sending no proximity information to the second base station after the connection transfer is complete when leaving the proximity of CSG cells in the whitelist and when the first base station does not signal the second base station that the mobile device enters the proximity of CSG cells in the CSG whitelist.

2. The method of claim 1, wherein performing the connection transfer from the first base station to the second base station of the wireless communication system comprises:
   performing a handover procedure or a RRC re-establishment procedure to transfer the connection from the first base station to the second base station.

3. A communication device of a wireless communication system for handling proximity information transmission, the communication device having a closed subscriber group (CSG) whitelist capable of providing a list of accessible CSG cells, comprising:
   means for sending the proximity information to a first base station of the wireless communication system when entering proximity of CSG cells in the CSG whitelist;
   means for performing a connection transfer from the first base station to a second base station of the wireless communication system;
   means for resending the proximity information to the second base station after the connection transfer is complete when staying in the proximity of the CSG cells in the CSG whitelist; and
   means for sending a second proximity information to the second base station after the connection transfer is complete when leaving the proximity of CSG cells in the whitelist and when the first base station signals the second base station that the mobile device enters the proximity of CSG cells in the CSG whitelist.

4. The communication device of claim 3, wherein the means for performing the connection transfer from the first base station to the second base station of the wireless communication system comprises:
   means for performing a handover procedure or a RRC re-establishment procedure to transfer the connection from the first base station to the second base station.

5. A communication device of a wireless communication system for handling proximity information transmission, the communication device having a closed subscriber group (CSG) whitelist capable of providing a list of accessible CSG cells, comprising:
   means for sending the proximity information to a first base station of the wireless communication system when entering proximity of CSG cells in the CSG whitelist;
   means for performing a connection transfer from the first base station to a second base station of the wireless communication system;
   means for resending the proximity information to the second base station after the connection transfer is complete when staying in the proximity of the CSG cells in the CSG whitelist; and
   means for sending no proximity information to the second base station after the connection transfer is complete when leaving the proximity of CSG cells in the whitelist and when the first base station does not signal the second base station that the mobile device enters the proximity of CSG cells in the CSG whitelist.

* * * * *